United States Patent
Terahara et al.

(10) Patent No.: US 7,081,497 B2
(45) Date of Patent: *Jul. 25, 2006

(54) BLOCK COPOLYMER AND USE THEREOF

(75) Inventors: Atsushi Terahara, Hioki-gun (JP); Daizaburo Yashiki, Tsukuba (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/682,515

(22) Filed: Oct. 10, 2003

(65) Prior Publication Data

US 2004/0138387 A1    Jul. 15, 2004

(30) Foreign Application Priority Data

Oct. 15, 2002   (JP) .............................. 2002-300083

(51) Int. Cl.
C08L 53/00    (2006.01)
C08L 25/06    (2006.01)

(52) U.S. Cl. .................. 525/89; 525/241; 525/353; 528/171

(58) Field of Classification Search .................. 525/89, 525/353, 352, 253, 241; 528/171
See application file for complete search history.

(56) References Cited

U.S. PATENT DOCUMENTS

| | | | |
|---|---|---|---|
| 5,985,477 A | 11/1999 | Iwasaki et al. | |
| 6,087,031 A | 7/2000 | Iwasaki et al. | |
| 2001/0041279 A1 | 11/2001 | Terahara et al. | |
| 2004/0126666 A1 | 7/2004 | Cao et al. | |
| 2004/0186262 A1 | 9/2004 | Maier et al. | |

FOREIGN PATENT DOCUMENTS

| | | |
|---|---|---|
| EP | 1 394 879 A1 | 3/2004 |
| JP | 10-21943 A | 1/1998 |
| JP | 10-45913 A | 2/1998 |
| JP | 11-502249 A | 2/1999 |
| JP | 11-273695 A | 10/1999 |
| JP | 2001-250567 A | 9/2001 |
| JP | 2004-345997 A | 12/2004 |
| JP | 2004-359925 A | 12/2004 |
| WO | WO 96/29360 A1 | 9/1996 |
| WO | WO 2004/042839 A2 | 5/2004 |

Primary Examiner—James J. Seidleck
Assistant Examiner—Olga Asinovsky
(74) Attorney, Agent, or Firm—Sughrue Mion, PLLC

(57) ABSTRACT

The present invention provides a block copolymer comprising at least one segment having an acid group and at least one segment substantially free from an acid group, wherein the segment having an acid group comprises a repeating unit which is a substituted repeating unit represented in the formula (1) with an acid group,

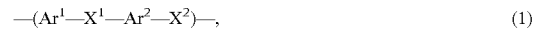

and in the formula(1), $X^1$ and $X^2$ being each independently —O— or —S—, $Ar^1$ and $Ar^2$ being each independently an aromatic group selected from the groups represented by the following formulae (2) to (4)

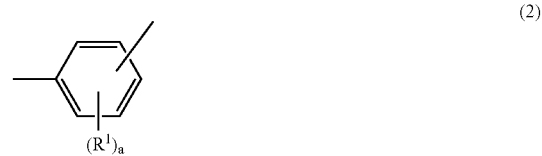

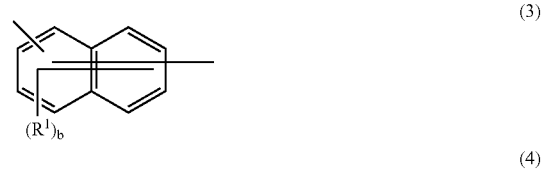

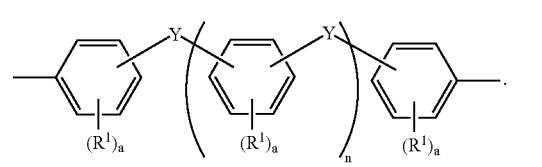

8 Claims, No Drawings

BLOCK COPOLYMER AND USE THEREOF

FIELD OF THE INVENTION

The present invention relates to a block copolymer and a polymer electrolyte, particularly, a block copolymer which is appropriately used for a fuel cell, and to a use thereof.

BACK GROUND OF THE INVENTION

Polymers with proton conductivity, namely, polymer electrolytes have been used as diaphragms of electrochemical devices such as primary cells, secondary cells or solid polymer type fuel cells. For example, polymer electrolytes including as effective components aliphatic polymers having perfluoroalkyl sulfonic acid as a super strong acid group in side chains, the main chain thereof being perfluoroalkane, have been conventionally used because of being superior in properties being applied to fuel cells. The following problems in these materials, however, have been pointed out: the cost is very high, heat resistance is low, reinforcement is required for using practically due to a low strength of the membrane.

Under such circumstances, low-cost polymer electrolytes which are substitutable for the above-mentioned polymer electrolytes have been actively developed in recent years. Above all, the following aromatic polymers have been regarded as one of the candidates: polymers in which a sulfonic acid group is introduced into aromatic polyether with a superior heat resistance and a high membrane strength, that is, aromatic polymers having a sulfonic acid groups as substituents and/or at side chains, the main chain thereof being aromatic, and for example, sulfonated polyether ketones (JP11-502249A) and sulfonated polyether sulfones (JP10-045913A and JP10-021943A) have been proposed.

In these polymers, generally, when sulfonic acid groups s are introduced into polymers in large amount, proton conductivity becomes higher and simultaneously water absorbency of polymer tends to be higher. In the case where membrane of such polymer with high water absorbency is used for the fuel cells, a great change in size of the membrane is occurred and the strength of the membrane is deteriorated by water produced during the use of the cells.

As polymer electrolytes solving the above problems, one of the present inventors have already proposed polymer electrolytes containing as effective components a block copolymer comprising at least one segment into which a sulfonic acid group is introduced and at least one segment into which a sulfonic acid group is not substantially introduced, in which at least one of all segments is a segment having an aromatic ring in the main chain thereof (JP2001-250567 A).

The present inventors have found out through further studies thereafter that block copolymers comprising a specific repeating unit as a segment into which an acid group is introduced provide polymer electrolytes, particularly, proton conductive membranes of fuel cells showing a superior performance in several properties such as membrane formability, chemical stability involving oxidation resistance, radical resistance and hydrolysis resistance, mechanical strength of membranes, water resistance, and proton conductivity, and also the inventors have further engaged various studies to complete the present invention.

SUMMARY OF THE INVENTION

That is, the present invention provides a block copolymer comprising at least one segment having an acid group and at least one segment substantially free from an acid group, wherein the segment having an acid group comprises a repeating unit which is a substituted repeating unit represented in the formula (1) with an acid group, $$—(Ar^1—X^1—Ar^2—X^2)—  \qquad (1),$$

and in the formula(1), $X^1$ and $X^2$ being each independently —O— or —S—, $Ar^1$ and $Ar^2$ being each independently an aromatic group selected from the groups represented by the following formulae (2) to (4),

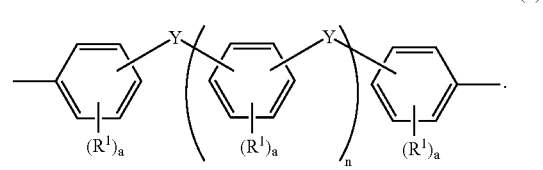

wherein, $R^1$ is a halogen atom, a hydroxyl group, a nitryl group, a nitro group, an amino group, an optionally substituted alkyl group with a carbon number of 1 to 10, an optionally substituted alkoxy group with a carbon number of 1 to 10, an optionally substituted aryl group with a carbon number of 6 to 10, or an optionally substituted aryloxy group with a carbon number of 6 to 10, a is an integer of 0 to 4, and b is an integer of 0 to 6, in a case of plural $R^1$, $R^1$ may be the same or different, or be bonded to each other, Y is a direct bond, —O—, —S—, an optionally substituted alkylene group with a carbon number of 1 to 6, or an optionally substituted alkylenedioxy group with a carbon number of 1 to 6, and n is an integer of 0 to 2, in a case of plural Y, Y may be the same or different, and in a case where both of $X^1$ and $X^2$ are —O—, both of $Ar^1$ and $Ar^2$ being not the group represented by the formula (2). And the present invention provides the use of the block copolymer.

DETAILED DESCRIPTION OF THE PRESENT INVENTION

The present invention is detailed hereinafter.

A block copolymer of the present invention comprises at least one segment having acid group and at least one segment substantially free from an acid group, in which the segment having an acid group comprises a repeating unit which is a substituted repeating unit of above formula (1) with an acid group.

$X^1$ and $X^2$ in the above formula (1) are each independently —O— or —S—, and preferably —O—.

$Ar^1$ and $Ar^2$ are each independently an aromatic group represented by the above formulae (2) to (4), all of which are divalent, and in the case where both of $X^1$ and $X^2$ are —O—, $Ar^1$ and $Ar^2$ are not simultaneously a group represented by the formula (2).

$R^1$ in the formulae (2) to (4) is a halogen atom, a hydroxyl group, a nitryl group, a nitro group, an amino group, an optionally substituted alkyl group with a carbon number of 1 to 10, an optionally substituted alkoxy group with a carbon number of 1 to 10, an optionally substituted aryl group with a carbon number of 6 to 10, or an optionally substituted aryloxy group with a carbon number of 1 to 10. In the case of the plural $R^1$, $R^1$ may be the same as or different from each other, or be bonded to each other.

The halogen atom includes fluorine, chlorine, bromine, iodine, and the like. The optionally substituted alkyl group with a carbon number of 1 to 10 includes an alkyl group with a carbon number of 1 to 10 such as methyl, ethyl, n-propyl, isopropyl, allyl, n-butyl, sec-butyl, tert-butyl, isobutyl, n-pentyl, 2,2-dimethylpropyl, cyclopentyl, n-hexyl, cyclohexyl, 2-methylpentyl and 2-ethylhexyl, and an alkyl group such that these groups are substituted with a halogen atom such as a fluorine atom, a chlorine atom, a bromine atom and an iodine atom, a hydroxyl group, a nitryl group, a nitro group, an amino group, an alkoxy group such as a methoxy group, an ethoxy group and isopropyloxy, an aryl group such as phenyl, and naphthyl, an aryloxy group such as phenoxy and naphthyloxy and the like.

The optionally substituted alkoxy group with a carbon number of 1 to 10 includes an alkoxy group with a carbon number of 1 to 10 such as methoxy, ethoxy, n-propyloxy, isopropyloxy, n-butyloxy, sec-butyloxy, tert-butyloxy, isobutyloxy, n-pentyloxy, 2,2-dimethylpropyloxy, cyclopentyloxy, n-hexyloxy, cyclohexyloxy, 2-methylpentyloxy and 2-ethylhexyloxy, and an alkoxy group such that these groups are substituted with a halogen atom such as a fluorine atom, a chlorine atom, a bromine atom and an iodine atom, a hydroxyl group, a nitryl group, a nitro group, an amino group, an alkoxy group such as a methoxy group, an ethoxy group and isopropyloxy, an aryl group such as phenyl and naphthyl, an aryloxy group such as phenoxy and naphthyloxy and the like.

Also, the optionally substituted aryl group with a carbon number of 6 to 10 involves an aryl group with a carbon number of 6 to 10 such as phenyl and naphthyl, and an aryl group such that these groups are substituted with a halogen atom such as a fluorine atom, a chlorine atom, a bromine atom and an iodine atom, a hydroxyl group, a nitryl group, a nitro group, an amino group, an alkoxy group such as a methoxy group, an ethoxy group and isopropyloxy, an aryl group such as phenyl and naphthyl, an aryloxy group such as phenoxy and naphthyloxy and the like.

The optionally substituted aryloxy group with a carbon number of 6 to 10 includes an aryloxy group with a carbon number of 6 to 10 such as phenoxy and naphthyloxy, and an aryloxy group such that these groups are substituted with a halogen atom such as a fluorine atom, a chlorine atom, a bromine atom and an iodine atom, a hydroxyl group, a nitryl group, a nitro group, an amino group, an alkoxy group such as a methoxy group, an ethoxy group and isopropyloxy, an aryl group such as phenyl and naphthyl, an aryloxy group such as phenoxy and naphthyloxy and the like.

In the case where two $R^1_s$ are bonded to each other and the bonding between two $R^1_s$ constitutes apart of cyclic structure, the part of cyclic structure includes a divalent structure such as ethylene, trimethylene, tetramethylene, butadienylene, ethylene-1,2-dioxy, biphenyl-2,2'-diyl, and the like.

Above all, $R^1$ is preferably a fluorine atom, a chlorine atom, a hydroxyl group, a nitryl group, a nitro group, an amino group, an alkyl group with a carbon number of 1 to 10 such as a methyl group, an ethyl group, an n-propyl group, an isopropyl group, an allyl group, an n-butyl group, a tert-butyl group, a cyclopentyl group and a 2-ethylhexyl group, an alkoxy group with a carbon number of 1 to 10 such as a methoxy group, an ethoxy group, an n-propyloxy group, an isopropyloxy group, an n-butyloxy group, a tert-butyloxy group, a cyclohexyloxy group and a 2-ethylhexyloxy group, an aryl group with a carbon number of 6 to 10 such as a phenyl group and a naphthyl group, an aryloxy group with a carbon number of 6 to 10 such as a phenoxy group and a naphthyloxy group, and the like. In particular, preferably a fluorine atom, a hydroxyl group, a methyl group, an ethyl group, a methoxy group, an ethoxy group, a phenyl group, a naphthyl group, a phenoxy group, and a naphthyloxy group.

The substitution position of $R^1$ described above in a group (2) to (4) is not particularly limited, and a favorable substitution position is such position that the introduction of an acid group is not intervened.

Also, in the formulae (2) to (4), a is an integer of 0 to 4 and b is an integer of 0 to 6. Both of a and b are preferably an integer of 0 to 2.

Y is a direct bond, —O—, —S—, an optionally substituted alkylene group with a carbon number of 1 to 6, or an optionally substituted alkylenedioxy group with a carbon number of 1 to 6. In the case of plural substituents, the substituents may be bonded to each other and the bonding between two substituents constitutes a part of cyclic partial structure.

The optionally substituted alkylene group with a carbon number of 1 to 6 includes methylene, ethylene, propane-2,2-diyl, cyclohexane-1,1-diyl, hexamethylene-1,6-diyl, and these groups substituted with a halogen atom, a hydroxyl group, a nitryl group, a nitro group, an amino group, an alkoxy group such as a methoxy group, an ethoxy group and isopropyloxy, an aryl group such as phenyl and naphthyl, an aryloxy group such as phenoxy and naphthyloxy and the like.

The optionally substituted alkylenedioxy group with a carbon number of 1 to 6 includes methylenedioxy, ethylenedioxy, and these alkylenedioxy groups substituted with a halogen atom, a hydroxyl group, a nitryl group, a nitro group, an amino group, an alkoxy group, an aryl group, an aryloxy group and the like.

Above all, Y is preferably a direct bond and an optionally substituted alkylene group with a carbon number of 1 to 6, more preferably a direct bond and an alkylene group with a carbon number of 1 to 6 optionally substituted with fluorine.

In the case of the presence of plural Y, Y may be the same or different, and preferably the same.

n is an integer of 0 to 2, preferably 0 or 1.

Examples of a group represented in the formula (2) include the following.

1,4-phenylene, 1,3-phenylene, 1,2-phenylene, 2-methyl-1,4-phenylene, 2,5-dimethyl-1,4-phenylene, 2-methoxy-1,4-phenylene, 2,5-dimethoxy-1,4-phenylene, 5-methoxy-1,3-phenylene, 5-hydroxy-1,3-phenylene, 2-phenyl-1,4-phenylene, 2-phenoxy-1,4-phenylene.

Example of a group represented in the formula (3) include the following.

1,4-naphthylene, 2,3-naphthylene, 1,5-naphthylene, 2,6-naphthylene, 2,7-naphthylene, 2,3-dimethyl-1,4-naphthylene, 6-methoxy-1,4-naphthylene, 6-hydroxy-1,4-naphthylene, 6-phenyl-1,4-naphthylene.

Examples of a group represented in the formula (4) include the following.

Biphenyl-4,4'-diyl, biphenyl-3,3'-diyl, biphenyl-3,4'-diyl, 3,3'-diphenylbiphenyl-4,4'-diyl, 3,3'-diphenoxybiphenyl-4,4'-diyl, 2,2-diphenylpropane-4',4''-diyl, 1,1-diphenylcyclohexane-4',4''-diyl, 2,2-diphenylpropane-3',3'',5',5''-tetramethyl-4',4''-diyl, diphenylether-4,4'-diyl, 3,3'-dimethyldiphenylether-4,4'-diyl, 1,4-diphenylbenzene-4',4''-diyl, and a group having the following structures.

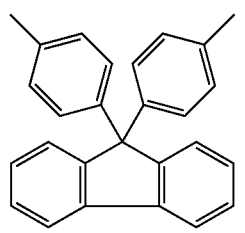

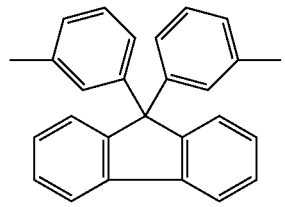

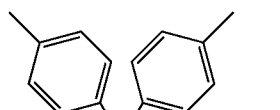

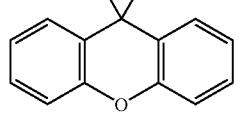

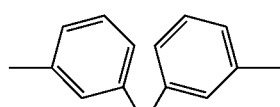

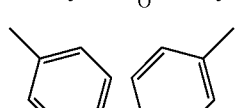

Examples of the above-mentioned formula (1) as a repeating unit include the following.

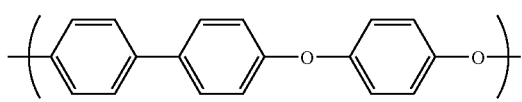

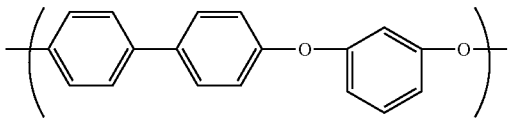

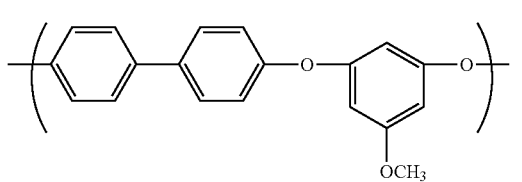

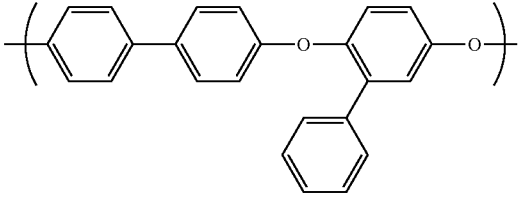

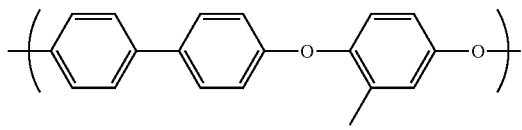

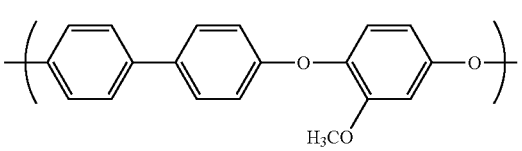

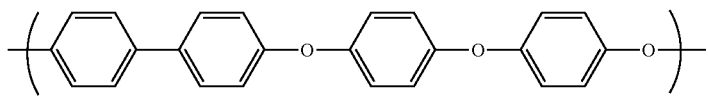

-continued
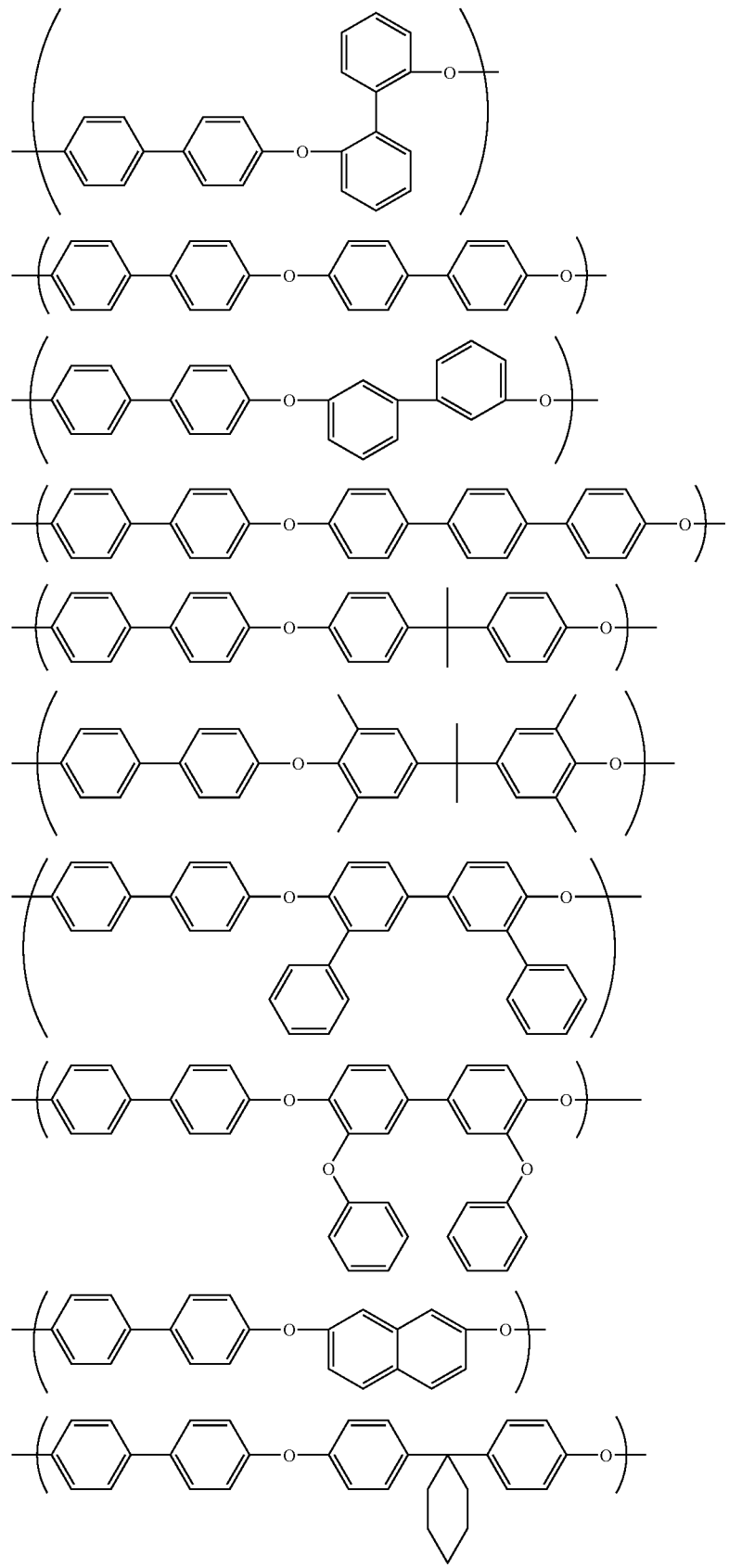

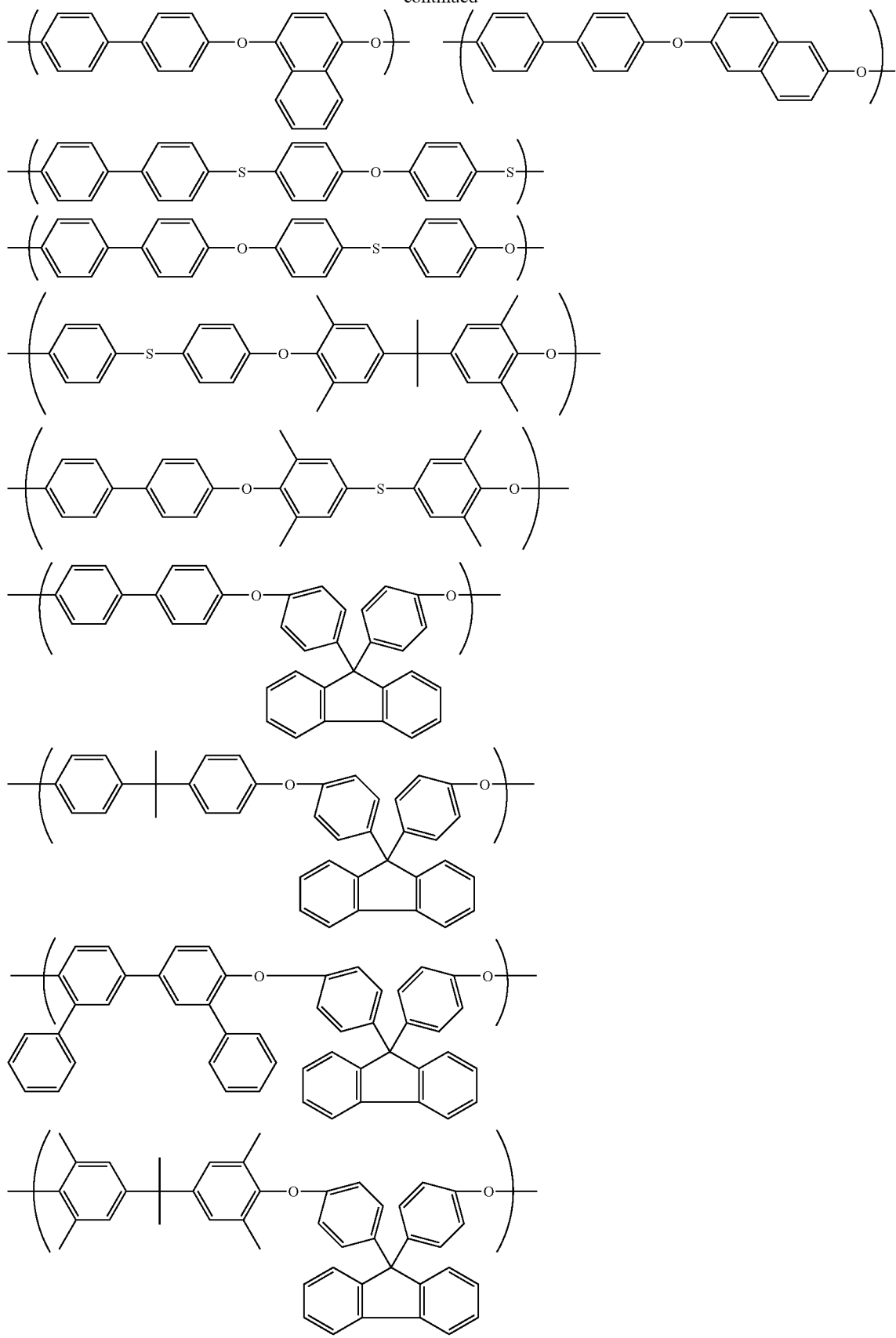

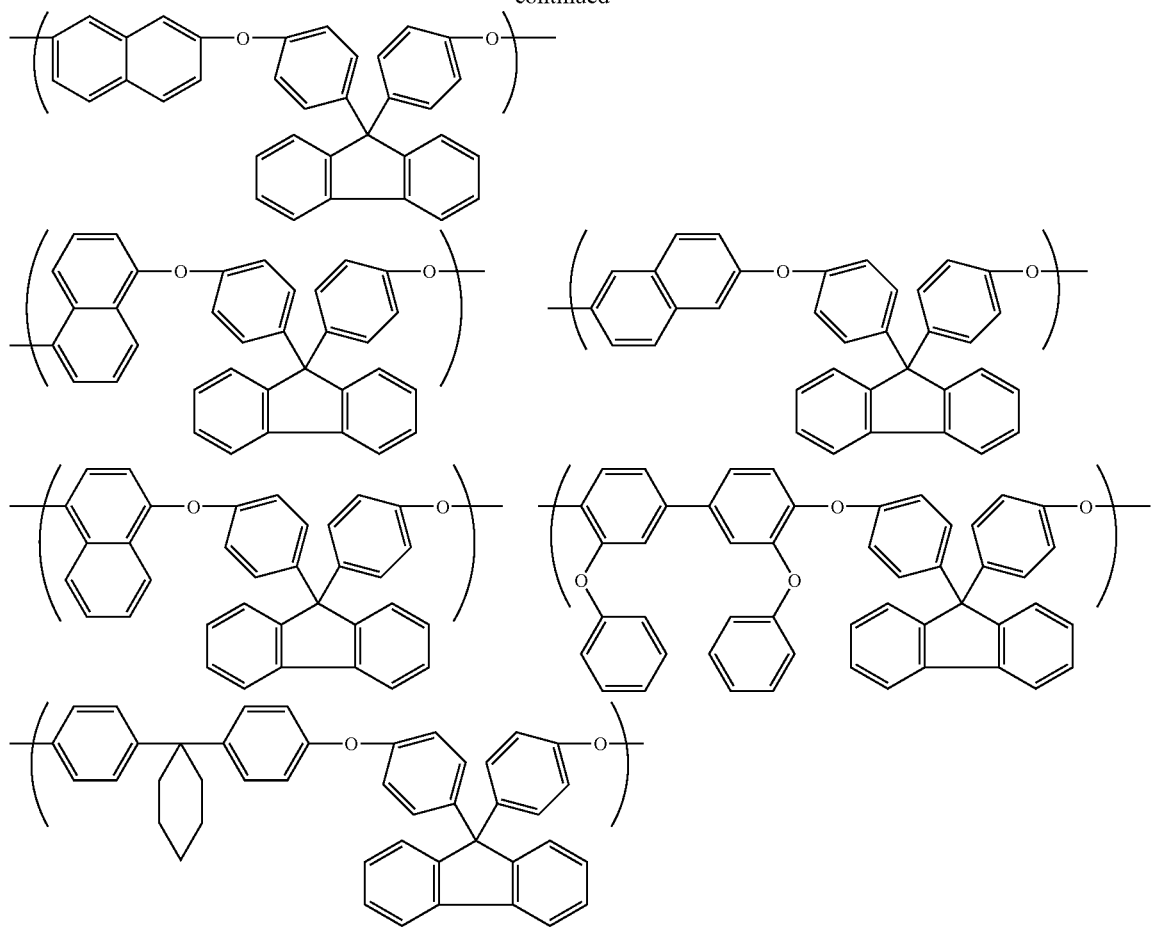

A block copolymer of the present invention contains a repeating unit which is a specific substituted repeating unit (1) as described above with an acid group, and the acid group may be group of weak acid group, strong acid group or a super strong acid group.

The weak acid group includes carboxylic acid, phosphonic acid and the like; the strong acid includes sulfonic acid, sulfonylimide and the like; and the super strong acid includes perfluoroalkylenesulfonic acid, perfluorophenylenesulfonic acid, perfluoroalkylenesulfonylimide and the like. Above all, the strong acid group and the super strong acid group are preferable, and the sulfonic acid group, perfluoroalkylenesulfonic acid group, perfluorophenylenesulfonic acid group and the like are more preferable.

The number of such acid group in a repeating unit (1) is usually 0.5 or more on average with respect to the repeating unit, preferably 1.0 or more on average. Also, the preferable number of acid group is 0.5 or more on average with respect to an aromatic ring of the formulae (2) to (4) composing the repeating unit, and the more preferable number is substantially 1 or more with respect to all of the aromatic rings. The acid group may be bonded to the aromatic ring directly or through linkage group.

Also, a block copolymer of the present invention comprises a segment substantially free from an acid group, in addition to the segment having an acid group as described above. Here, the segment substantially free from an acid group includes such that the number of an acid group is 0.1 or less on average with respect to a repeating unit composing the segment.

Such segment substantially free from an acid group is preferably an aromatic polymer, and for example, a polymer, which comprises a repeating unit represented by the following formula (5), is preferably used.

$$—(Ar^3—Z—Ar^4—Z)—\qquad(5)$$

In the formula, Z is a direct bond, —O— or —S—, and $Ar^3$ and $Ar^4$ are each independently an aromatic group selected from the group represented by the following formulae (6) to (10).

(6)

(7)

(8)

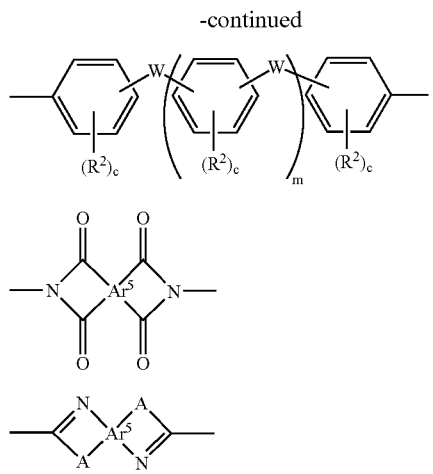

(9)

(10)

In the formula, R² is a halogen atom, a hydroxyl group, a nitryl group, a nitro group, an amino group, an optionally substituted alkyl group with a carbon number of 1 to 10, an optionally substituted alkoxy group with a carbon number of 1 to 10, an optionally substituted aryl group with a carbon number of 6 to 10, or an optionally substituted aryloxy group with a carbon number of 6 to 10. c is an integer of 0 to 4, and d is an integer of 0 to 6. In the case of the presence of plural R², R² may be the same or different, or be bonded to each other to form a cyclic partial structure. W is a direct bond, —O—, —S—, —CO—, —SO₂, an optionally substituted alkylene group with a carbon number of 1 to 6, or an optionally substituted alkylenedioxy group with a carbon number of 1 to 5, and m is an integer of 0 to 2. In the case of the presence of plural W, W may be the same or different. In the case where W is substituted with plural substituents, the substituents may be bonded to each other and the bonding between two substituents composes a part of cyclic structure. A is —O—, —S—, or —NR³— (R³ is a hydrogen atom or an optionally substituted alkyl group with a carbon number of 1 to 10), and two of A may be the same as or different from each other. Ar⁵ is an aromatic group selected from the group represented by the following formulae (11) to (14)

(11)

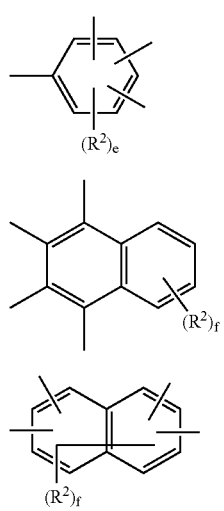

(12)

(13)

(14)

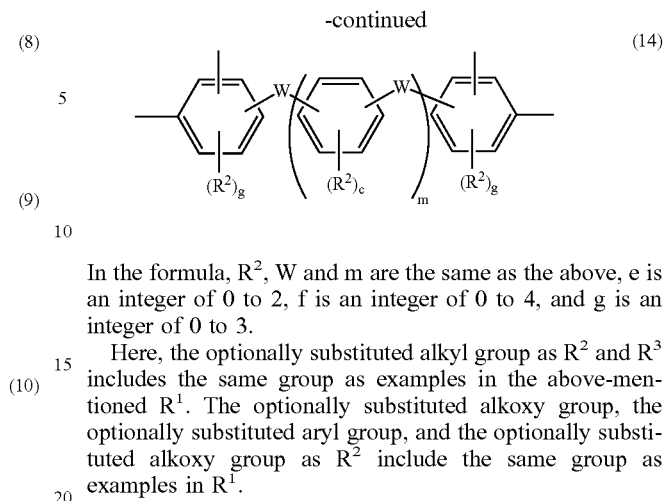

In the formula, R², W and m are the same as the above, e is an integer of 0 to 2, f is an integer of 0 to 4, and g is an integer of 0 to 3.

Here, the optionally substituted alkyl group as R² and R³ includes the same group as examples in the above-mentioned R¹. The optionally substituted alkoxy group, the optionally substituted aryl group, and the optionally substituted alkoxy group as R² include the same group as examples in R¹.

The optionally substituted alkylene group with a carbon number of 1 to 6 and the optionally substituted alkylenedioxy group with a carbon number of 1 to 6 in W include the same group as examples in the above-mentioned Y.

An example of the segment substantially free from an acid group includes a segment derived from poly-para-phenylene, polyimide, polybenzoxazole, polybenzothiazole, polybenzimidazole, and the like in the case where Z in the formula (5) is a direct bond.

In the case where Z is —O—, an example includes a segment derived from polysulfone, polyether sulfone, polyether ketone, polyether ether ketone, and the like.

In the case where Z is —S—, an example includes a segment derived from polyphenylene sulfide and the like.

An example of block copolymer of the present invention includes a block polymer which comprises a segment comprising the repeating unit, which is a substituted repeating unit represented by formula (1) with acid group, as described above and a segment substantially free from an acid group comprising a repeating unit (5), as described above.

A producing method thereof includes;

I. A method such that after producing a block copolymer comprising a repeating unit (1) and a repeating unit (5), an acid group is selectively introduced into the repeating unit (1), II. A method such that after producing polymer comprising a substituted repeating unit by substituting a repeating unit (1) with acid group, the polymer is bonded to a polymer comprising a repeating unit (5) to obtain a block copolymer, and the like.

Here, a block copolymer comprising a repeating unit (1) and a repeating unit (5) in the method I can be produced by combining and reacting a polymer comprising a repeating unit (1), in which both ends are a hydroxy group or a halogeno group, or one end is a hydroxy group and the other is a halogeno group, and a polymer comprising a repeating unit (5), in which both ends are a hydroxy group or a halogeno group, or one end is a hydroxy group and the other is a halogeno group. For example, the method is as follows: a method of condensing a polymer having a hydroxy group at the both ends and a polymer having a halogeno group at the both ends; a method of condensing a polymer having a hydroxy group at one end and a halogeno group at the other respectively and another polymer having a hydroxy group at one end and a halogeno group at the other respectively; a method of bonding a polymer having a hydroxy group at the both ends and another polymer having a hydroxy group at the both ends by using a compound acting as a bonding group, such as 4,4'-difluorobenzophenone, perfluorobiphenyl and 4,4'-difluorodiphenyl sulfone; a method of bonding a polymer having a halogeno group at the both ends and another polymer having a halogeno group at the both ends by using a compound acting as a bonding group, such as 4,4'-dihydroxybiphenyl, bisphenol A, 4,4'-dihydroxybenzophenone and 4,4'-dihydroxydiphenyl sulfone; and the like. A block copolymer can be produced by a method of polymerizing a polymer and/or a monomer, and they have reactive groups capable of causing the same reaction as the above-mentioned reaction.

A method of introducing an acid group a block copolymer comprising a repeating unit (1) and a repeating unit (5) includes;

I-1. a method of introducing a sulfonic acid group as acid group by dissolving or suspending a block copolymer in concentrated sulfuric acid, or by reacting with concentrated sulfuric acid, chlorosulfuric acid, fuming sulfuric acid, sulfur trioxide and the like after at least partially dissolving a block copolymer in an organic solvent; or I-2. a method of converting a mercapto group, a methyl group, a hydroxy group, a bromo group and the like, which is introduced into a block copolymer in advance, into a sulfonic acid group, an optionally substituted methylene sulfonic acid group, an optionally substituted methylenephosphoric group, an optionally substituted sulfoalkyloxy group, an optionally substituted sulfophenyloxy group, a carboxylic group and the like by oxidation reaction, substitution reaction, condensation reaction and the like.

In the case of using the above-mentioned method I-1 of introducing an acid group, both or either of $R^2$ and W in the above-mentioned formulae (6) to (14) are preferably an electron withdrawing group. In the case of the presence of plural $R^2$ and W, $R^2$ and W may be the same or different, and all of $R^2$ and W may be an electron with drawing group or a part of them may be an electron withdrawing group. On the other hand, in the case of using the above-mentioned method I-2 of introducing an acid group, $R^2$ and W are not particularly limited.

In the case of using the above-mentioned method II, that is, a method such that after producing polymer comprising a substituted repeating unit by substituting a repeating unit (1) with an acid group, the polymer is bonded to a polymer comprising a repeating unit (5) to produce a block copolymer, the polymer comprising a substituted repeating unit can be produced with a similar method of introducing an acid group to the above-mentioned I-1 and I-2, and can be produced by polymerizing a monomer into which an acid group is introduced in advance. Also, a block copolymer can be produced, for example, by the same method as the above.

A producing method of a polymer comprising a repeating unit (1) is not particularly limited and includes a method of polymerizing diphenols and dihaloaryls by the Ullmann reaction in the case where X is O, a method of synthesizing by polycondensing dihaloaryls and sodium sulfide in the case where X is S, and the like.

A producing method of a polymer comprising a repeating unit (5) is not particularly limited and can be produced in conformity with a known method. The polymer obtained by the above-mentioned producing method can be identified by a known method such as $^1$NMR, $^{13}$CNMR and IR, and the molecular weight thereof can be determined by the GPC method. The identification may be performed after or before producing a block copolymer, preferably before producing a block copolymer.

Thus, a block copolymer of the present invention is obtained, and the quantity of an acid group in the whole block copolymer is preferably 0.1 to 4.0 mmol (ion exchange capacity: 0.1 to 4.0 meq/g) with respect to 1 g of polymer electrolyte comprising the block copolymer, 0.8 to 2.5 meq/g represented by ion exchange capacity is more preferable. Less quantity of an acid group may bring lower proton conductivity and the insufficient performance as polymer electrolytes for fuel cells, while more quantity of an acid group may bring inferior water resistance. The quantity of an acid group in the whole block copolymer can be optionally controlled by changing the number of an acid group into a segment and/or block composition and/or the number-average molecular weight of each block.

The number-average molecular weight in a hydrophilic segment which has an acid group is preferably 1000 to 100000, more preferably 2000 to 50000. The number-average molecular weight in a hydrophobic segment which is substantially free from an acid group is preferably 2000 to 200000, more preferably 5000 to 100000.

The number-average molecular weight of a block copolymer of the present invention is preferably 5000 to 1000000, more preferably 15000 to 200000. Less number-average molecular weight may occasionally bring lower membrane strength and heat resistance of the copolymer, while more number-average molecular weight may occasionally bring lower dissolubility in a solvent used in the step of forming a membrane.

Next, the use of a block copolymer of the present invention as diaphragms of electrochemical devices such as fuel cell is described.

In this case, a block copolymer of the present invention is typically used in the form of membranes, and a method of converting into the membranes is not particularly limited, and for example, a method of forming the state of a solution into membranes (a solution casting method) is preferably used.

Specifically, a copolymer is dissolved in a proper solvent to cast and coat the solution on a glass plate and be formed into a membrane by removing the solvent. The solvent used for forming a membrane is not particularly limited if the solvent can dissolve a copolymer and thereafter can be removed, and the following are appropriately used: an aprotic polar solvent such as N,N-dimethylformamide, N,N-dimethylacetamide (DMAc), N-methyl-2-pyrrolidone and dimethyl sulfoxide (DMSO); a chlorine-substituted solvent such as dichloromethane, chloroform, 1,2-dichloroethane, chlorobenzene and dichlorobenzene; alcohols such as methanol, ethanol and propanol; or alkylene glycol monoalkyl ether such as ethylene glycol monomethyl ether, ethylene glycol monoethyl ether, propylene glycol monomethyl ether and propylene glycol monoethyl ether. These solvents can be used alone and also in a mixture of two or more kinds thereof if necessary. Above all, dimethyl sulfoxide, N,N-dimethylformamide, N,N-dimethylacetamide, N-methyl pyrrolidone and the like are preferable because of a high dissolubility of a polymer.

The thickness of a membrane is not particularly limited, preferably 10 to 300 μm. A membrane having a thickness of less than 10 μm may occasionally provide an insufficient strength in practical, while a membrane having a thickness of more than 300 μm may provide higher membrane resistance and consequently a tendency toward a deterioration in properties of electrochemical devices. The membrane thickness can be controlled by the concentration of a solution and the coating thickness on a substrate.

A plasticizer, a stabilizer, a release agent and the like used for typical polymers can be added to a block copolymer of the present invention for the purpose of improving various physical properties of a membrane. Also, another polymer can be composite-alloyed with a copolymer of the present invention by a method of mixing and co-casting in the same solvent, and the like.

It is additionally known in the use for fuel cells that inorganic or organic particulates are added as a water-retaining agent for facilitating water control. These known methods can be used unless any of them is adverse to the objects of the present invention.

A block copolymer of the present invention can be cross-linked by irradiating an electron beam, radioactive rays and the like for the purpose of improving mechanical strength of a membrane. In addition, a method is known such as to be composite through the impregnation into porous membranes and sheets, to reinforce a membrane by mixing fibers and pulps therewith, and the like. These known methods can be used unless any of them is adverse to the objects of the present invention. Also, a block copolymer of the present invention can be used as a polymer ion exchange component which is a component of a catalyst composition composing a catalyst layer of fuel cells.

Next, a fuel cell of the present invention is described. A fuel cell of the present invention can be manufactured by joining a conductive matter as a catalyst and a current collector on both surfaces of the membrane obtained from a block polymer of the present invention.

The catalyst is not particularly limited if it can activate an oxidation-reduction reaction with hydrogen or oxygen, and known catalysts can be used, preferably platinum particulates. The platinum particulates are preferably used while being frequently carried by particulate or fibrous carbon such as activated carbon and graphite.

Known materials can be used also for a conductive matter as the current collector, and porous carbon fabric, carbon nonwoven fabric or carbon paper is preferable for efficiently transporting raw material gas to the catalyst.

A method such as a method described in J. Electrochem. Soc.: Electrochemical Science and Technology, 1988, 135 (9), 2209 can be used for a method of joining platinum particulates or carbon carrying platinum particulates to porous carbon nonwoven fabric or carbon paper and a subsequent method of joining the porous carbon nonwoven fabric or carbon paper with a polymer electrolyte membrane.

A fuel cell of the present invention thus manufactured can be used for various types using hydrogen gas, reformed hydrogen gas and methanol as fuel.

EXAMPLES

The present invention is hereinafter described mentioning examples, and is not limited to these examples. The proton conductivity was measured by an alternating-current method with the conditions of a temperature of 80° C. and a humidity of 90%. The ion exchange capacity was measured by a titrimetric method. The water uptake was obtained by measuring the quantity increased of the membrane weight after immersing a dry membrane in deionized water with a temperature of 100° C. for 2 hours, on the basis of the weight of the dry membrane.

Reference Example 1

The Production of poly(oxy(3,3-diphenyl-4,4'-biphenylylene)oxy-4,4'-biphenyly lene) (both ends —OH type)

21.66 g of 3,3'-diphenyl-4,4'-dihydroxybiphenyl, 18.72 g of 4,4'-dibromobiphenyl, 80 g of benzophenone and 20 ml of toluene were put in a flask under an atmosphere of nitrogen to be stirred and dissolved. 8.98 g of potassium carbonate was added thereto to be heated with stirring and be dehydrated under the azeotropic conditions of the toluene and water, and thereafter the toluene was removed by being distilled. Further, 6 ml of cuprous chloride/quinoline catalyst (0.1 g/10 ml) prepared in advance was added and heated with stirring at a temperature of 210° C. The reaction solution was poured into a large quantity of methanol which is acidified by adding small amount of acetic acid, then the resulted precipitate were filtered and dried, thereby obtaining a polymer having a hydroxyl group at both ends thereof (hereinafter referred to as P1).

Reference Example 2

The Production of 1,6-bis(4-fluorophenyl)perfluorohexane 26.64 g of p-fluoroiodobenzene, 100 ml of DMSO and 15.24 g of copper powder were put in a flask under an atmosphere of nitrogen to be sufficiently stirred at a temperature of 110° C. Next, 30.46 g of 1,6-diiodoperfluorohexane was slowly dropped and stirred at a temperature of 120° C. for 20 hours. Then, the reaction solution was filtered so as to remove the unreacted copper, and was dropped into an aqueous solution containing a small quantity of NaCl. Then, the resulting deposits were filtered. The deposits were dissolved in acetone to be filtered and thereafter distill out the acetone. The residue was dissolved in methanol to add water and deposits were filtered. The deposits were distilled at a reduced pressure (155° C., 5 mmHg), thereby obtaining 20 g of a colorless solid.

Reference Example 3

The Production of poly(oxy(1,3-phenylene)oxy-4,4'-biphenylylene) (both ends —OH type)

167.59 g of 4,4'-dihydroxybiphenyl, 600 g of benzophenone and 180 ml of toluene were put in a flask under an atmosphere of nitrogen to be stirred and dissolved. 8.98 g of potassium carbonate was added thereto to be heated with stirring and be dehydrated under the azeotropic conditions of the toluene and water, and thereafter the toluene was removed by being distilled. Further, 200.52 g of m-dibromobenzene was added, and subsequently 0.43 g of cuprous chloride was added and heated with stirring at a temperature of 200° C. The reaction solution was poured into a large quantity of methanol which is acidified by adding small amount of acetic acid, resulted precipitate was filtered and dried to obtain a polymer having a hydroxyl group at both ends thereof (hereinafter referred to as P3).

Reference Example 4

The Production of Polyether Sulfone (Both Ends —F Type)

1000.00 g of SUMIKAEXCEL PES 4003P (polyether sulfone having a hydroxyl group as end group, manufactured by SUMITOMO CHEMICAL CO., LTD.), 7.59 g of potassium carbonate, 2500 ml of DMAc and 500 ml of toluene were put in a flask under an atmosphere of nitrogen to be heated with stirring at a temperature of 160° C. and be dehydrated under the azeotropic conditions. After being cooled at room temperature, 53.60 g of decafluorobiphenyl was added and heated with stirring at a temperature of 80° C. for 3.5 hours. The reaction solution was dropped into a large quantity of water, the resulted precipitate was filtered, recovered, and washed in a mixed solvent of methanol/acetone, and then dried at a temperature of 80° C., thereby obtaining a polymer having an F group at both ends thereof (hereinafter referred to as P4).

Example 1

The Production of a Block Copolymer 15.00 g of P1 obtained in Reference Example 1, 23.777 g of 4,4'-dihydroxydiphenyl sulfone, 27.848 g of 4,4'-dichlorodiphenyl sulfone, 13.821 g of potassium carbonate and 100 g of diphenyl sulfone were put in a flask to be heated with stirring at a temperature of 250° C. and be dehydrated. Thereafter, the reaction solution was further heated with stirring at a temperature of 290° C. for 3 hours. After being solidified at room temperature, the reaction solution was pulverized with a mixer to be washed in a large quantity of methanol, and the obtained insoluble was filtered and recovered to be dried at a reduced pressure at a temperature of 80° C., thereby obtaining a block copolymer. The obtained block copolymer was stirred with concentrated sulfuric acid at a temperature of 40° C., and after being made into a homogeneous solution, the solution continued to be further stirred for 4 days. The obtained solution was dropped into a large quantity of ice water, and the obtained precipitate was filtered and recovered. Further, mixer washing by ion exchange water was repeated until the washings become neutral, thereafter so as to be dried at a reduced pressure at a temperature of 40° C., thereby obtaining a sulfonated block copolymer. The sulfonated block copolymer was dissolved in DMAc at a density of approximately 15 weight % to be subsequently cast on a glass plate and remove a solvent therefrom by drying at a temperature of 80° C., thereby obtaining a transparent membrane. It was confirmed by the integration ratio of $^1$H NMR measurement of the block copolymer and the results of measuring the ion exchange capacity that a sulfonic acid group was not substantially introduced into a hydrophobic segment and was selectively introduced into a segment derived from P1, and the number of introduced acid groups was 4 or more with respect to a repeating unit of P1. The results of evaluation are shown together in Table 1.

Example 2

The Production of a Block Copolymer 2.00 g of P1 obtained in Reference Example 1, 2.428 g of 4,4'-dihydroxydiphenyl sulfone, 1.520 g of potassium carbonate, 24 ml of DMAc and 6 ml of toluene were put in a flask to be dehydrated under the azeotropic conditions of the toluene and water, and thereafter the toluene was removed by being distilled. Next, 1.226 g of 1,6-bis (4-fluorophenyl) perfluorohexane was added and reacted at a temperature of 170° C. for 2 hours to be thereafter cooled to a temperature of 80° C., and 2.506 g of decafluorobiphenyl was added and heated with stirring at a temperature of 80° C. for 6 hours. The reaction solution was poured into a large quantity of methanol, and the obtained precipitate was filtered and recovered to be dried at a reduced pressure at a temperature of 80° C., thereby obtaining a block copolymer. The obtained block copolymer was stirred with concentrated sulfuric acid at a temperature of 40° C., and after being made into a homogeneous solution, the solution continued to be further stirred for 2 days. The obtained solution was dropped into a large quantity of ice water, and the obtained precipitate was filtered and recovered. Further, mixer washing by ion exchange water was repeated until the washings become neutral, thereafter so as to be dried at a reduced pressure at a temperature of 40° C., thereby obtaining a sulfonated block copolymer. The sulfonated block copolymer was formed into a membrane by the same manner as in Example 1, thereby obtaining a transparent membrane. It was confirmed by the integration ratio of $^1$H NMR measurement of the block copolymer and the results of measuring the ion exchange capacity that a sulfonic acid group was not substantially introduced into a hydrophobic segment and was selectively introduced into a segment derived from P1, and the number of introduced acid radicals was 4 or more with respect to a repeating unit of P1. The results of evaluation are shown together in Table 1.

Example 3

The Production of a Block Copolymer 144 g of SUMIKAEXCEL PES 5003P (polyether sulfone having a hydroxyl group as end group, manufactured by SUMITOMO CHEMICAL CO., LTD.), 48 g of P3, 4.84 g of potassium carbonate, 960 ml of DMAc and 3 ml of toluene were put in a flask to be heated with stirring and be dissolved. 9.52 g of decafluorobiphenyl was added thereto and heated with stirring at a temperature of 80° C. for 5 hours. The reaction solution was dropped into a large quantity of methanol which is acidified by adding small amount of hydrochloric acid hydrochloric acidic methanol, and the obtained precipitate was filtered and recovered to be dried at a temperature of 80° C., thereby obtaining a block copolymer. The obtained block copolymer was dissolved in concentrated sulfuric acid to be sulfonated at a temperature of 60° C. The obtained solution was dropped into a large quantity of ice water, and the obtained precipitate was filtered and recovered. Further, mixer washing by deionized water was repeated until the washings become neutral, thereafter so as to be dried at a temperature of 40° C., thereby obtaining a sulfonated block copolymer. The sulfonated block copolymer was dissolved in DMAc at a concentration of approximately 15 weight % to be subsequently cast on a glass plate and remove a solvent therefrom by drying at a temperature of 8 ° C., thereby obtaining a transparent membrane. It was confirmed by the integration ratio of $^1$H NMR measurement of the block copolymer and the results of measuring the ion exchange capacity that a sulfonic acid group was not substantially introduced into a hydrophobic segment and was selectively introduced into a segment derived from P3, and the number of introduced acid radicals was 3 or more with respect to a repeating unit of P3. The results of evaluation are shown together in Table 1.

Example 4

The Production of a Block Copolymer 3.553 g of 3,3'-diphenyl-4,4'-dihydroxybiphenyl, 3.120 g of 4,4'-dibromobiphenyl, 15 g of benzophenone and 5 ml of toluene were put in a flask under an atmosphere of nitrogen to be stirred and dissolved. 1.520 g of potassium carbonate was added thereto to be heated with stirring and be dehydrated under the azeotropic conditions of the toluene and water, and thereafter the toluene was removed by being distilled. Further, 1 ml of cuprous chloride/quinoline catalyst (0.1 g/10 ml) prepared in advance was added and heated with stirring at a temperature of 200° C. After being cooled, 9.886 g of 4,4'-dihydroxydiphenyl sulfone, 5.667 g of potassium carbonate, 50 ml of N-methylpyrrolidone and 10 ml of toluene were added in a flask to be heated with stirring and be dehydrated under the azeotropic conditions of the toluene and water, and thereafter the toluene was removed by being distilled. After being cooled, 8.727 g of 4,4'-difluorobenzophenone was added and heated with stirring at a temperature of 200° C. for 6 hours. The reaction solution was dropped into a large quantity of methanol which is acidified by adding small amount of hydrochloric acid, and the obtained precipitate was filtered and recovered to be dried at a temperature of 80° C., thereby obtaining a block copolymer. The obtained block copolymer was dissolved in concentrated sulfuric acid to be sulfonated at a temperature of 40° C. The obtained solution was dropped into a large quantity of ice water, and the obtained precipitate was filtered and recovered. Further, mixer washing by deionized water was repeated until the washings become neutral, thereafter so as to be dried at a temperature of 40° C., thereby obtaining a sulfonated block copolymer. The sulfonated block copolymer was dissolved in DMAC at a density of approximately 15 weight % to be subsequently cast on a glass plate and remove a solvent therefrom by drying at a temperature of 80° C., thereby obtaining a transparent membrane. It was confirmed by the integration ratio of $^1$H NMR measurement of the block copolymer and the results of measuring the ion exchange capacity that a sulfonic acid group was not substantially introduced into a hydrophobic segment and was selectively introduced into a segment derived from an alternating copolymer of 3,3'-diphenyl-4,4'-dihydroxybiphenyl and 4,4'-dibromobiphenyl, and the number of introduced acid radicals was 4 or more with respect to a repeating unit of the above-mentioned alternating copolymer. The results of evaluation are shown together in Table 1.

Example 5

The Production of a Block Copolymer 100.00 g of P1 synthesized in accordance with the conditions of Reference Example 1, 8.29 g of potassium carbonate, 3000 ml of DMAc and 250 ml of toluene were put in a flask to be heated with stirring at a temperature of 150° C. and be dehydrated under the azeotropic conditions. After being cooled at room temperature, 400.00 g of P4 synthesized in accordance with the conditions of Reference Example 4 was added and heated with stirring at a temperature of 80° C. for 6 hours. The reaction solution was dropped into a large quantity of methanol which is acidified by adding small amount of hydrochloric acid, and the obtained precipitate was filtered and recovered to be dried at a temperature of 80° C., thereby obtaining a block copolymer. The obtained block copolymer was dissolved in concentrated sulfuric acid to be sulfonated at a temperature of 60° C. The obtained solution was dropped into a large quantity of ice water, and the obtained precipitate was filtered and recovered. Further, mixer washing by deionized water was repeated until the washings become neutral, thereafter so as to be dried at a temperature of 40° C., thereby obtaining a sulfonated block copolymer. The obtained block copolymer has substantially the same structure as the block copolymer of Example 1 and offers substantially the same properties.

Comparative Example 1

The Production of Sulfonated Polyether Ether Sulfone 4,4'-dihydroxydiphenyl sulfone, 4,4'-dihydroxybiphenyl and 4,4'-dichlorodiphenyl sulfone were polycondensed by using diphenyl sulfone as a solvent at a molar ratio of 7:3:10 respectively under the coexistence of potassium carbonate at a temperature of 200 to 290° C. The obtained polymer was sulfonated by concentrated sulfuric acid to synthesize a random copolymer in which a sulfonic acid group was introduced into every biphenyl unit. The sulfonated random copolymer was formed into a membrane by the same manner as in Example 1, thereby obtaining a transparent membrane. The results of evaluation are shown together in Table 1.

Comparative Example 2

The Production of a Block Copolymer (a Polymer Described in JP 2001-250567A)

99 mg of anhydrous cuprous chloride and 266 mg of 2-methylbenzimidazole were stirred in 1 ml of toluene under the atmosphere at room temperature for 15 minutes. 8.5 g of 2-phenylphenol and 30 ml of toluene were added thereto and stirred under an atmosphere of oxygen at a temperature of 50° C. for 5 hours. Then, the reaction solution was poured into methanol containing hydrochloric acid to deposit a polymer, and the polymer was filtered and dried, thereby obtaining poly(2-phenylphenylene ether) (hereinafter referred to as PE1) 3.0 g of SUMIKAEXCEL PES 5003P (polyether sulfone having a hydroxyl group as end group, manufactured by SUMITOMO CHEMICAL CO., LTD.), 0.75 g of PE1, 0.04 g of potassium carbonate, 15 ml of N,N-dimethylacetamide (hereinafter referred to as DMAc) and 3 ml of toluene were added and heated with stirring to be dehydrated under the azeotropic conditions of the toluene and water, and thereafter the toluene was removed by being distilled. 0.05 g of 4,4'-difluorobenzophenone was added thereto and heated with stirring at a temperature of 160° C. for 5 hours. The reaction solution was dropped into a large quantity of methanol which is acidified by adding small amount of hydrochloric acid, and the obtained precipitate was filtered and recovered to be dried at a reduced pressure at a temperature of 80° C., thereby obtaining 3.8 g of a block copolymer. 2.0 g of the obtained block copolymer was stirred with 20 ml of 98% sulfuric acid under room temperature, and after being made into a homogeneous solution, the solution continued to be further stirred for 2 hours. The obtained solution was dropped into a large quantity of ice water, and the obtained precipitate was filtered and recovered. Further, mixer washing by ion exchange water was repeated until the washings become neutral, thereafter so as to be dried at a reduced pressure at a temperature of 40° C., thereby obtaining a sulfonated block copolymer. The sulfonated block copolymer was formed into a membrane by the same manner as in Example 1, thereby obtaining a transparent membrane. The results of evaluation are shown together in Table 1.

TABLE 1

| | Ion Exchange Capacity | Water Absorbency | Proton Conductivity |
|---|---|---|---|
| Example 1 | 1.46 | 86 | 8.1E−2 |
| Example 2 | 1.52 | 57 | 8.6E−2 |
| Example 3 | 1.36 | 28 | 9.9E−2 |
| Example 4 | 1.49 | 71 | 9.9E−2 |
| Comparative Example 1 | 1.14 | 35 | 1.2E−2 |
| Comparative Example 2 | 1.40 | 63 | 7.1E−2 |

A block copolymer of the present invention has a favorable membrane formability, a high stability and a high water resistance as well as a high proton conductivity. Furthermore, in the case being used as proton conductive membranes of fuel cells, a block copolymer of the present invention offers a high property of electric power generation, leading to advantages in industry as polymer electrolytes.

What is claimed is;

1. A block copolymer comprising at least one segment having an acid group and at least one segment substantially free from an acid group, wherein the segment having an acid group comprises a repeating unit which is a substituted repeating unit represented in the formula (1) with an acid group,

$$—(Ar^1—X^1—Ar^2—X^2)—, \quad (1)$$

and in the formula (1), $X^1$ and $X^2$ being each independently -O- or —S—, $Ar^1$ and $Ar^2$ being each independently an aromatic group selected from the groups represented by the following formulae (2) to (4),

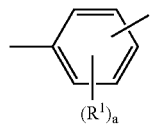

(2)

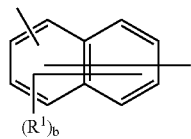

(3)

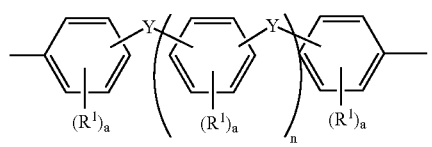

(4)

wherein, R1 is a halogen atom, a hydroxyl group, a nitro group, a nitro group, an amino group, an optionally substituted alkyl group with a carbon number of 1 to 10, an optionally substituted alkoxy group with a carbon number of 1 to 10, an optionally substituted aryl group with a carbon number of 6 to 10, or an optionally substituted aryloxy group with a carbon number of 6 to 10, a is an integer of 0 to 4, and b is an integer of 0 to 6, in a case of plural $R^1$, $R^1$ may be the same or different, or be bonded to each other, Y is a direct bond, -0-, —S—, an optionally substituted alkylene group with a carbon number of 1 to 6, or an optionally substituted alkylenedioxy group with a carbon number of 1 to 6, and n is an integer of 0 to 2, in a case of plural Y, Y may be the same or different, and in a case where both of $X^1$ and $X^2$ are -0-, both of $Ar^1$ and $Ar^2$ being not the group represented by the formula (2)

wherein the segment substantially free from an acid group comprises a repeating unit represented by the following formula (5),

$$—(Ar^3—Z^1—Ar^4—Z^2)—, \quad (5)$$

in the formula (5), $Z^1$ and $Z^2$ independently representing direct bond, —O— or —S—, and $Ar^3$ and $Ar^4$ being each independently an aromatic group selected from the groups represented by the following formulae (6) to (10),

(6)

(7)

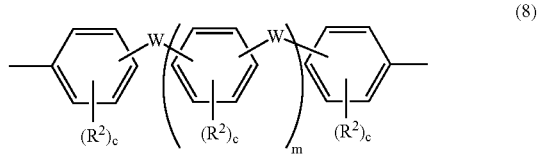

(8)

(9)

(10)

wherein, $R^2$ is a halogen atom, a hydroxyl group, a nitrile group, a nitro group, an amino group, an optionally substituted alkyl group with a carbon number of 1 to 10, an optionally substituted alkoxy group with a carbon number of 1 to 10, an optionally substituted aryl group with a carbon number of 6 to 10, or an optionally substituted aryloxy group with a carbon number of 6 to 10, c is an integer of 0 to 4, and d is an integer of 0 to 6, in a case of plural $R^2$, $R^2$ may be the same or different, or be bonded to each other, W is a direct bond, —O—, —S—, —CO—, —SO$_2$-, an optionally substituted alkylene group with a carbon number of 1 to 6, or an optionally substituted alkylenedioxy group with a carbon number of 1 to 6, m is an integer of 0 to 2, in a case of plural W, W may be the same or different, A is —O—, —S—, or —NR$^3$- in which R$^3$ is a hydrogen atom or an optionally substituted alkyl group with a carbon number of 1 to 10, two of A may be the same or different, $Ar^5$ is an aromatic group selected from the groups represented by the following formulae (11) to (14)

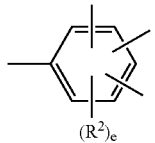

(11)

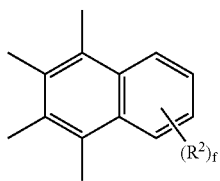

(12)

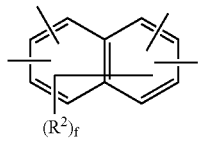

(13)

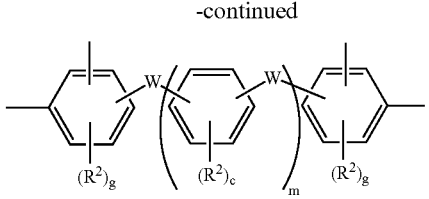

(14)

where, $R^2$, W and m are the same as the above, e is an integer of 0 to 2, f is an integer of 0 to 4, and g an integer of 0 to 3.

2. The copolymer according to claim 1, wherein the acid group is a strong acid group or a super strong acid group.

3. The copolymer according to claim 1, wherein $X^1$ and $X^2$ are —O—.

4. A polymer electrolyte comprising the copolymer according to claim 1.

5. A polymer electrolyte membrane comprising the polymer electrolyte according to claim 4.

6. A catalyst composition comprising the polymer electrolyte according to claim 4.

7. A fuel cell comprising the polymer electrolyte membrane according to claim 5.

8. A fuel cell comprising the catalyst composition according to claim 6.

\* \* \* \* \*